April 9, 1929. W. W. NUGENT 1,708,517
OIL FILTER
Filed May 19, 1922
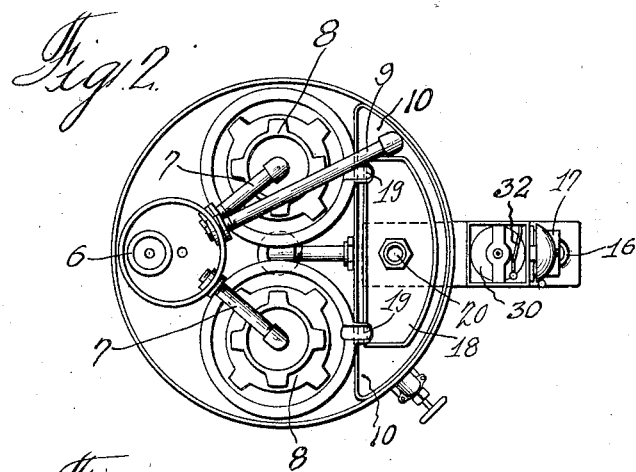
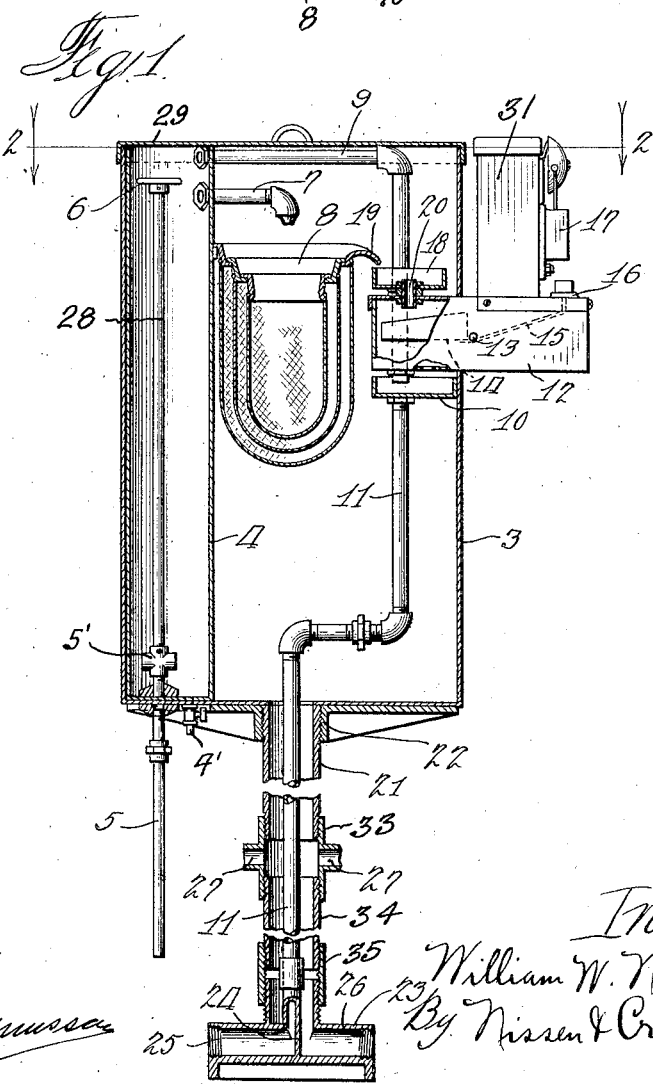

Patented Apr. 9, 1929.

1,708,517

UNITED STATES PATENT OFFICE.

WILLIAM W. NUGENT, OF CHICAGO, ILLINOIS.

OIL FILTER.

Application filed May 19, 1922. Serial No. 562,086.

My invention relates to oil filters and has for one of its objects the provision of a simple and efficient filtering mechanism adapted to permit the easy flow of oil to bearings, and the like, without trapping or pocketing.

A further object is the provision of a filter receptacle mounted on a pedestal which may have branch lines taken therefrom permitting the oil to flow down hill to desired bearings, and the like.

Other objects will appear hereinafter.

An embodiment of my invention is illustrated in the accompanying drawing, forming a part of this specification, and in which—

Fig. 1 is a vertical section taken through a filtering apparatus embodying my invention; and Fig. 2 is a section taken on line 2—2 of Fig. 1.

Referring more particularly to the drawing, a filter receptacle or tank 3 is indicated as being cylindrical, but may be of any preferred design. Disposed within the receptacle 3 is a well or water separating chamber 4 extending from the bottom to the top of the receptacle 3. Through the bottoms of receptacle 3 and well 4 extends a supply pipe 5 which is adapted to conduct the impure oil into the well 4. Through one or more openings 5' near the bottom of well 4 a stem extends up from the fitting having the opening 5' therein and has a handle 6 at its top for adjusting said fitting in position, but said stem and handle may be dispensed with when so desired. The well 4 may be arranged in the casing 3 in any desired manner, the tubular form shown making an efficient and economical construction. A removable flanged lid or cover is shown at 29 to serve as a closure for the top of the tank 3 and to permit renewal of the filter elements when desired.

Near the top of well 4 are discharge pipes 7. As many pipes 7 will be provided as there are filter elements, to be described later, in the receptacle 3. Water in the impure oil coming from pipe 5 will settle to the bottom of well 4 and the oil and certain impurities will remain on top. This water and such impurities as settle to the bottom of the water separating chamber may be drawn off through valve 4'. The impure oil will pass out through the pipes 7 where it will be discharged into filter elements 8. These filter elements may be of any desired construction, such as that shown, which is substantially that disclosed in my United States Letters Patent No. 1,044,074, issued November 12, 1912. The oil upon passing through the filter elements 8 falls to the bottom of receptacle 3 where it is drawn off for use.

At the top of well 4 is an overflow pipe 9 which extends across and downwardly in the receptacle 3 and has its discharge end connected with a tray 10. A pipe 11 is connected with the tray 10 and extends down through the bottom of receptacle 3 to carry overflow liquids from the device. The intake opening of pipe 9 is placed well above the discharge pipes 7 and low enough to prevent the well 4 from overflowing into the clean oil in receptacle 3.

Above the tray 10 is a closed casing or metal box 12 in which is a shaft 13 pivotally carrying a tiltable pan 14. The shaft 13 also has an arm 15 which makes electrical contact with a stop 16 in the member 12. An alarm device 17 is mounted on the housing 12, and the parts 12 to 17, inclusive, may be the same as set forth in my pending application, Serial No. 393,575, filed July 2, 1920, for overflow alarms for filters.

In the structure shown in the accompanying drawings the source of current for the electrically operated bell 17 is in the form of a dry cell 30 in the casing 31. One terminal of the dry cell may be connected to the metal casing 12 and therefore to the metal shaft 13 and the metal counterweight arm 15. The other terminal 32 of the dry cell may be connected to the electro-magnetic mechanism of the alarm 17 which in turn is connected to the insulated contact 16. Normally the pan 14 is up and the counterweight arm 15 down and therefore the circuit is broken at the contact 16, but when overflow from either or both of the filter elements occurs the circuit from the dry cell 30 will be completed to operate the electro-magnetically operated bell of well-known type and construction.

Above the member 12 is a tray 18 large enough to catch the overflowing oil from spouts 19 of the filters 8. A pipe 20 connects the tray 18 with the casing 12 and provides means for draining said tray into the pan 14 in housing 12. Should the filters 8 become clogged, the oil instead of running through the filters would run out of spouts 19 into tray 18 and down through opening 20 into pan 14, tilting the latter on shaft 13, bringing the parts 13, 14 and 15 to the positions shown in Fig. 1. This would set into operation an electric signal as above described to attract the attendant's attention to the fact that the filtering mechanism 8 was not functioning properly. Oil after leaving pan 14 would run down through a suitable opening in the bottom of casing 12 into tray 10 and thence down through pipe 11 out of opening 25.

It should be noted that if the alarm mechanism is omitted temporarily or otherwise the spouts 19, as shown in Fig. 2, are in position to direct overflow to the tray 10.

The filtering apparatus above referred to is suitable for use in lubricating many kinds of machinery and may be used in such a construction as set forth in my United States Letters Patent No. 1,207,067, issued December 5, 1916, for continuous oiling and filtration apparatus. In such devices requiring lubrication, oftentimes parts of these devices are quite high and if pipes conducting oil to them were run down low and then raised up to the parts requiring the oil, pockets would be formed in the pipes preventing the ready flow of the lubricant to these parts of the machinery. My present improvement consists in mounting the filtering apparatus on a hollow pedestal which is in communication with the clean oil of the filter receptacle so that this pedestal may have branch pipes extending therefrom at heights permitting the oil to run down hill all the way to the parts requiring lubrication. I therefore provide a tubular pedestal 21 which may be attached to the bottom of receptacle 3 in any desired manner, such as by the threaded connection 22 shown.

At the bottom of the pedestal 21 is a fitting 23 having a partition 24 therein, and the fitting at one side of partition 24 is connected with pipe 11 so that the liquids discharged through the pipe 11 may leave the fitting 23 through opening 25. The other side of the fitting 23 is in communication with the interior of the pedestal 21 and is adapted to discharge clean oil through opening 26 in said fitting. The opening 26 may be connected with any part of the lubricating system shown in my United States Letters Patent No. 1,207,067, above referred to, or other devices requiring lubrication. The pedestal 21 may have branch pipes 27 taken off at any height in the pedestal so as to permit conducting the oil downwardly to the higher parts of the devices to be lubricated. This permits the oil to run down to the parts requiring lubrication without the likelihood of forming traps or air pockets to retard the flow of lubricant.

It should be noted that the fitting 33 having the branch pipes 27 may be threaded to the upper pipe section 21 and to the lower pipe section 34. The latter may be connected to the bottom T-fitting 23 by means of the tubular joint 35. It will thus be seen that by varying the lengths of the pipe sections 21 and 34 the branch pipes 27 may be adjusted to various heights while the height of the tank 3 and the height of the T-fitting 23 remains the same. The pipes leading to the lubricating nozzles in the system may be connected to the branch pipes 27 and also to the lower branch pipe 23, or the latter may be closed with a screw plug and the upper branch pipes 27 used. In any event it is desirable to have the oil pass by gravity from the tank 3 to the places where distribution of the lubricant is desired.

I claim:—

1. Filtering apparatus comprising a filter receptacle; a tubular pedestal attached to said receptacle and in communication with the interior of the latter; an overflow pipe extending through said pedestal into said receptacle; and a fitting at the bottom of the pedestal having one end portion connected with the interior of the overflow pipe and another part connected with the interior of the pedestal.

2. Filtering apparatus comprising a filter receptacle; a tubular pedestal attached to said receptacle and in communication with the interior of the latter; an overflow pipe extending through said pedestal into said receptacle; a fitting at the bottom of the pedestal having one end portion connected with the interior of the overflow pipe and another part connected with the interior of the pedestal; and a branch pipe connected with the pedestal between the fitting and receptacle.

3. Filtering apparatus comprising a receptacle; a tubular pedestal attached to said receptacle and having an opening intermediate its ends; a fitting attached to the pedestal; a partition in the filter dividing the latter into two compartments, one of said compartments being in open communication with the interior of said pedestal and a pipe leading through the pedestal and connected with the other compartment of said fitting.

4. Filtering apparatus comprising a filter receptacle, a pedestal depending from and in open communication with said receptacle, a discharge pipe connected with said pedestal intermediate the ends of the latter and in communication with the passageway in said pedestal, and an overflow pipe extending through the pedestal with its lower end sealed against the interior space of the pedestal which surrounds said overflow pipe.

5. Filtering apparatus comprising a filter receptacle; a well in the receptacle; a filter element in the receptacle; an overflow alarm chamber extending into the receptacle; a tray above said overflow alarm chamber and in open communication with the latter; a tray below the overflow alarm chamber and in open communication with the latter; an overflow pipe leading from said well to the second-mentioned tray; a discharge pipe leading from the last-mentioned tray out of the receptacle; and a filter in the receptacle having an overflow pipe in communication with the tray above said overflow alarm chamber.

6. Filtering apparatus comprising a filter receptacle; a well in the receptacle; a filter element in the receptacle; a feed pipe extending into the well; an oil discharging pipe leading from the well; an overflow pipe having its intake opening above the intake opening of said oil discharging pipe; a tray mounted for receiving overflowing liquids from the filter and said overflow pipe; and a pipe for conveying said overflowing liquids from said receptacle.

7. Filtering apparatus comprising a filter receptacle; a well in the receptacle; a feed pipe extending into the well; an oil discharge pipe connected with the well; an overflow pipe connected with the well and having its intake opening above the intake opening of the oil discharge pipe; a filter in the receptacle in open communication with the oil discharge pipe; an alarm device having a portion in the path of oil passing from the filter element; a tray adapted to receive said oil from the filter and fluid from the overflow pipe connected with the well; and a discharge pipe connected with said tray.

8. In filtering apparatus, the combination with a receptacle adapted to contain lubricating material, of a filter in said receptacle, a pedestal for said receptacle, said pedestal being composed of sections to permit extension of the pedestal and the latter having a passageway for the lubricating material, and an outlet port connected to said pedestal at an elevation variable in accordance with the extension of the pedestal in order to effect distribution of the lubricating material by gravity flowing from said receptacle through said passageway to said outlet port.

9. In filtering apparatus, the combination with a receptacle adapted to contain lubricating material, of filtering mechanism in said receptacle, an upright tubular elongated pedestal for said receptacle and having a passageway in communication therewith, an outlet port connected to said passageway at a predetermined distance from the bottom of said receptacle, and connections on said pedestal for permitting the same to be extended to increase the height of said outlet port to assure the flow of lubricating material by gravity from said receptacle through said pedestal passageway to a predetermined location.

10. In a filtering system, the combination with a tank for containing a lubricant to be distributed by gravity, of a filter in said tank, a sectional pipe pedestal for supporting said tank in elevated position, said pipe being in open communication with said tank to receive lubricant therefrom by gravity, and a pipe fitting for tapping said pipe pedestal at adjusted elevation to receive lubricant therefrom by gravity for distribution in the system by gravity, said pipe pedestal being in sections to permit adjustment in elevation of said pipe fitting.

11. In filtering apparatus, the combination with filtering mechanism, of a reservoir, alarm mechanism adapted to be operated by overflow from said filtering mechanism, an overflow by-pass, and means for directing overflow from said filtering mechanism and from said by-pass so as not to be mixed with the oil in said reservoir.

12. Filtering apparatus comprising a receptacle adapted to contain a lubricant, a tubular pedestal for said receptacle and in open communication with the interior of the latter, an overflow pipe, and a fitting connected to said pedestal and having separate chambers one communicating with the interior of said pedestal to receive lubricant therefrom and the other communicating with said overflow pipe.

13. In a filtering system, the combination with a tank adapted to contain a liquid lubricant, of a filter in said tank, a pipe pedestal for supporting said tank and comprising a removable section, and a pipe fitting above said section for tapping said pipe pedestal to receive lubricant therefrom by gravity for distribution in the system by gravity, the passageway in said pedestal being in communication with the interior of said tank and with said pipe fitting.

14. The combination with a tank adapted to contain a liquid, of a tubular pedestal for said tank, a fitting connected to said pedestal and having a partition dividing such fitting into two chambers, one of said chambers being in open communication with the interior of said pedestal, and a pipe connecting the other chamber to the interior of said tank.

15. Filtering apparatus comprising a tank, a tubular pedestal therefor, a fitting connected to said pedestal, said fitting having a partition dividing the same into separate chambers, one of said chambers being in open communication with the interior of said pedestal, and a pipe connecting the other chamber to the upper portion of said tank in position to receive overflow from said tank independently of flow from said tank through said pedestal.

16. Filtering apparatus comprising a filter receptacle, a filter element in said receptacle, an overflow alarm chamber extending into said receptacle, alarm mechanism connected to said chamber, means for directing overflow into said chamber to effect the operation of said alarm mechanism, and an overflow pipe for receiving the overflow from said chamber.

17. Filtering apparatus comprising a tank for containing filtered liquid, filtering mechanism in the tank, overflow alarm mechanism, means for directing overflowing liquid from said filtering mechanism to said overflow alarm mechanism, an overflow pipe for receiving the liquid overflow from said filtering mechanism after operating said alarm mechanism, and an overflow pipe extending from the intake of said tank to said first-named overflow pipe.

18. Filtering apparatus comprising a filter receptacle, an intake water-separating compartment in said receptacle, a filter element in said receptacle, overflow alarm mechanism, means for directing overflow from said filter element to said alarm mechanism to operate the same, an overflow pipe for receiving overflow after operating said alarm mechanism, and an additional overflow connected to the upper portion of said water-separating compartment and communicating with said first-mentioned overflow pipe.

19. Filtering apparatus comprising a filter receptacle, a filter element therein, overflow alarm mechanism, means comprising a receiving tray for directing overflow from said filter element to said alarm mechanism to operate the same, and an overflow pipe in position to receive such overflow after the overflow operates said alarm mechanism.

20. In filtering apparatus, the combination with a filter device, of overflow indicating mechanism therefor, means for directing overflow to said indicating mechanism to operate the same, and a by-pass overflow connection operable independently of said overflow-directing-means for preventing spilling from the filter device.

21. Filtering apparatus comprising a receptacle, a plurality of filter elements therein, overflow alarm mechanism, a tray connected to said alarm mechanism in position to receive overflow from all of said elements and direct such overflow to said alarm mechanism to operate the same, an additional tray in position to receive such overflow after operation of the alarm mechanism, and a discharge passage connected to said last-named tray.

22. Filtering apparatus comprising a tank, a plurality of filter elements therein, overflow alarm mechanism comprising a chamber extending into said tank, a tray inside of the tank above said chamber in position to receive overflow from all of said filter elements and conduct it to said chamber to operate said alarm mechanism, and means for discharging the overflow after operation of the alarm mechanism.

23. Filtering apparatus comprising a tank, filtering mechanism therein, overflow alarm mechanism comprising a chamber extending into said tank, means for directing overflow from said filtering mechanism into said chamber to operate said alarm mechanism, an overflow pipe for said tank, a tray for receiving liquid from said overflow and in position for also receiving liquid from said chamber, and a discharge pipe connected to said tray.

24. In a filtering system, the combination with an elevated tank adapted to contain filtered lubricant, of a water-separating chamber, a feed pipe connected to said chamber, a tubular pedestal in open communication with said tank, a discharge port from the passageway in said pedestal, filtering mechanism in said tank, means for directing lubricant from the upper portion of said water-separating chamber to said filtering mechanism, an overflow pipe connected to said chamber above said directing means, overflow alarm apparatus for said filtering mechanism comprising a chamber projecting into said tank, means for directing overflow from said filtering mechanism to said overflow alarm apparatus to operate the same, a tray below said last-named chamber for receiving all overflow, and a discharge pipe leading from said tray through said pedestal.

25. In filtering apparatus, the combination with filtering mechanism, of a receiving tank, overflow indicating mechanism, connections for directing overflow to operate said indicating mechanism, and a large-capacity overflow operable independently of said directing connections.

26. In filtering apparatus, the combination with an oil reservoir, of a receiving compartment, filtering mechanism, means for directing oil from the receiving compartment to said filtering mechanism, overflow indicating mechanism associated with said filtering mechanism, a pipe for directing overflow away from the oil reservoir so as not to mix with the filtered oil therein, and an overflow pipe connected between the upper end of said receiving compartment and said pipe to serve as a large capacity overflow operable independently of the overflow from said filtering mechanism.

27. In filtering apparatus, the combination with an oil reservoir, of filtering mechanism therein, means comprising an overflow pipe for receiving overflow from said filtering mechanism, and means for supporting an upper receiving end of said pipe in position in said reservoir to receive overflow from said reservoir when the depth of the oil in the latter exceeds a predetermined amount.

In testimony whereof I have signed my name to this specification on this 17th day of May, A. D. 1922.

WILLIAM W. NUGENT.